United States Patent

[11] 3,602,334

| [72] | Inventor | John Raymond Goodman |
| | | 427 Sutton Road, Walsall, England |
| [21] | Appl. No. | 27,338 |
| [22] | Filed | Apr. 10, 1970 |
| [45] | Patented | Aug. 31, 1971 |
| [32] | Priority | Apr. 10, 1969, Apr. 22, 1969 |
| [33] | | Great Britain |
| [31] | | 18407/69 and 20495/69 |

[54] SILENCER PROTECTIVE SHIELD
9 Claims, 6 Drawing Figs.

[52] U.S. Cl. .................................................. 181/72, 181/61
[51] Int. Cl. .................................................. F01n 7/00
[50] Field of Search .................................................. 181/33, 33.4, 35, 36, 61–63, 72, 41, 49; 180/64 A

[56] References Cited
UNITED STATES PATENTS

| 2,107,588 | 2/1938 | Smith | 181/61 |
| 2,833,368 | 5/1958 | Lowther | 181/72 UX |
| 3,237,716 | 3/1966 | Parsons | 181/72 |

FOREIGN PATENTS

| 542,099 | 12/1941 | Great Britain | 181/72 |

Primary Examiner—Robert S. Ward, Jr.
Attorney—Irving Seidman

ABSTRACT: A shield for fitment to a motor vehicle silencer includes a protector plate which is fitted underneath the casing of the silencer to protect the underside thereof, the protector plate being strapped to the casing.

INVENTOR.
JOHN RAYMOND GOODMAN

INVENTOR
JOHN RAYMOND GOODMAN
By *Irving Seidman*
ATTORNEY

3,602,334

SILENCER PROTECTIVE SHIELD

BACKGROUND OF THE INVENTION

1. Field of the Invention

This invention relates to a shield for a motor vehicle silencer.

2. Description of the Prior Art

The silencers fitted to motor vehicle exhaust systems are liable to damage by stones or chippings thrown upwardly and sidewardly by the wheels of the vehicle and the wheels of the vehicle also project mud and slush towards the motor vehicle silencer and, particularly when the roads have been salted in frosty conditions, this can cause corrosion of the silencer.

It is accordingly an object of the present invention to provide a shield for fitment to a motor vehicle silencer to protect the silencer against damage by such stones or chippings and to reduce the rate of corrosion of the silencer.

SUMMARY OF THE INVENTION

A motor vehicle silencer includes an elongated casing having an inlet pipe and an outlet pipe and a shield is strapped to said silencer by a plurality of strap means, said shield including a protector plate for fitment underneath the casing to protect the underside thereof.

DESCRIPTION OF THE PREFERRED EMBODIMENTS

Figure 1:
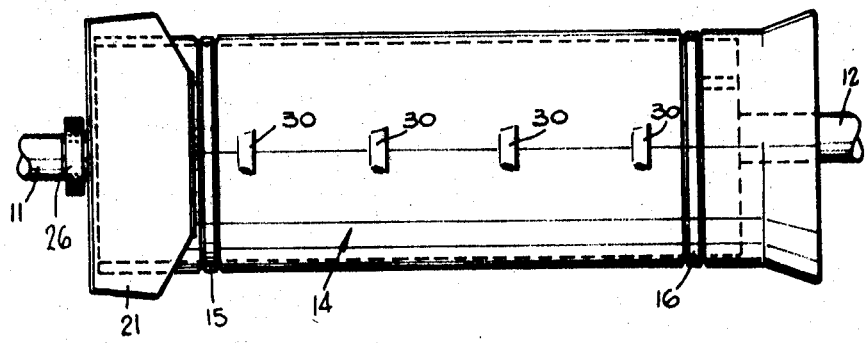
FIG. 1 is an underneath plan view of a motor vehicle silencer having a shield fitted to it.
Figure 2:
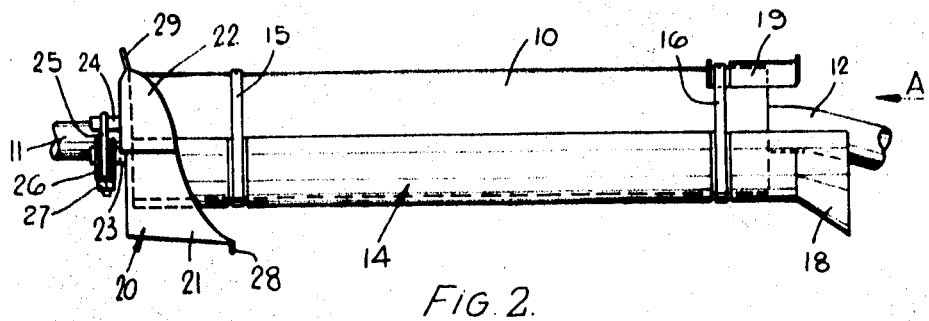
FIG. 2 is a side view of the silencer and shield.
Figure 3:
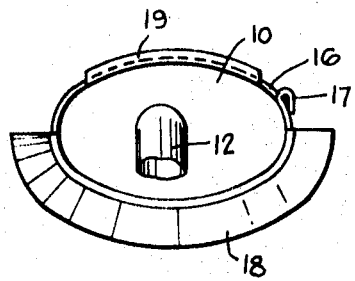
FIG. 3 is an end view of the silencer and shield in the direction of the arrow 'A' in FIG. 2.

As shown in FIGS. 1, 2 and 3, a motor vehicle silencer includes an elongated casing 10 of generally elliptical cross section which has an inlet pipe 11 at its front end and an outlet pipe 12 at its rear end. The casing 10 is mounted with its axis of elongation horizontal and extending in the direction of travel of the vehicle to which it is fitted.

The shield shown in FIGS. 1, 2 and 3 includes a protector plate 14 which is shaped to correspond to the configuration of the underside of the casing 10 and, as shown in FIGS. 2 and 3, the protector plate 14 covers the bottom half of the casing 10. The protector plate 14 is formed with a pair of longitudinally spaced inwardly directed ribs which present outwardly directed channels and the protector plate 14 is attached to the casing 10 by means of metal straps 15 and 16 which are received in said channels. Each strap 15, 16 includes a conventional clip 17 for effecting tightening thereof.

The protector plate 14 is slightly longer than the casing 10 and the rear end part thereof is downwardly flared as shown at 18 so that, in use, any mud, slush, dire or chippings projected onto the plate 14 will be deflected by the skirt 18 away from the outlet pipe 12 of the silencer to protect the outlet pipe 12.

The shield also includes a rear top plate 19 which is fitted on top of the rear of the casing 10 and projects rearwardly therefrom and this plate 19 serves to protect the inner end portion of the outlet pipe 12 and the joint between the pipe 12 and the end plate of the casing 10. This rear plate 19 is secured to the casing 10 by strap 16 and is formed with an outwardly directed channel which receives the strap 16.

A front plate 20 is secured to the front of the casing 10 and this front plate 20 is formed in two parts 21 and 22 and each part 21, 22 includes a part-elliptical front wall portion which is spaced from the front wall of the casing 10 with a part-cylindrical portion 23, 24 projecting forwardly from each part 21, 22 of the front plate 20 for fitment around the inlet pipe 11. A U-bolt is fitted over said part-cylindrical portions 23 and 24 and the U-bolt fastening mechanism includes a stirrup 26 and nuts 27 tightened onto the limbs of the U-bolt 25 to clamp the part-cylindrical portions 23 and 24 firmly around the inlet pipe 11.

The front plate parts 21 and 22 each include side portions for protecting the front side portions of the casing and the lower part 21 extends rearwardly from the front of the casing substantially up to the strap 15 and terminates in a downwardly directed lip 28. The upper front plate part 22 has an upstanding flange formation 29 and the construction of the front plate 20 is such that the front of the casing 10 is protected from mud, slush, stones and chippings thrown up by the wheels of the vehicle.

The protector plate 14 is formed with a series of vent openings 30 formed by pressing out parts of the plate 14 and said vents 30 serve to facilitate cooling of the casing 10 of the silencer.

The shield shown in FIGS. 1 and 2 can readily be assembled on a silencer already fitted to a motor vehicle by connecting the rear top plate 19 and the protector plate 14 to the casing 10 by the straps 15 and 16 and then assembling the front plate 20 around the front of the casing and clamping it to the inlet pipe 11 by the U-bolt fastener arrangement.

Figure 4:
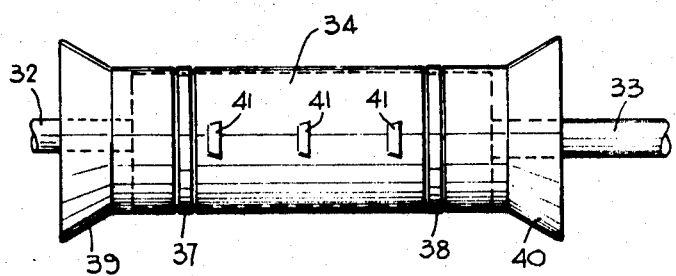
FIG. 4 is an underneath plan view of a motor vehicle silencer having an alternative form of shield fitted to it.
Figure 5:
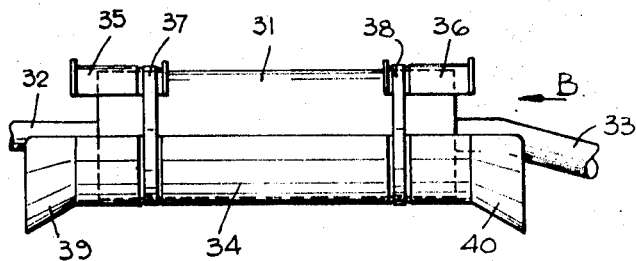
FIG. 5 is a side view of the silencer and shield shown in FIG. 4
Figure 6:
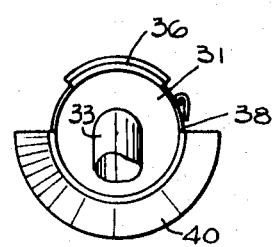
FIG. 6 is an end view of the silencer and shield shown in FIG. 5 in the direction of the arrow 'B.'

The shield shown in FIGS. 4, 5 and 6 is for fitment to a motor vehicle silencer which has a generally cylindrical casing 31 arranged with its axis extending horizontally and in the direction of travel of the vehicle and the casing 31 has an inlet pipe 32 and an outlet pipe 33. The shield includes a protector plate 34 for fitment underneath the casing 31, a front top plate 35 and a rear top plate 36. The protector plate 34 is slightly longer than the casing 31 and is formed with a pair of longitudinally spaced inwardly directed ribs which present outwardly directed channels which receive fixing straps 37 and 38 for attaching the protector plate 34 to the casing 31. The protector plate 34 has a flared skirt portion 39 at its front and a flared skirt portion 40 at its rear. The front top plate 35 is formed to provide an outwardly directed channel for receiving the strap 37 and the rear top plate 36 is also formed with an outwardly directed channel for receiving the strap 38. The shield of FIGS. 4, 5 and 6 is thus assembled and secured to the silencer by appropriately positioning the protector plate 34 and the front and rear top plates 35 and 36 and then securing them to the casing by the straps 37 and 38. The protector plate 34 is formed with three vent openings 41 as shown in FIG. 4.

Although two specific forms of shield have been described above and shown in the drawings it will be appreciated that the configuration of the shield components will depend on the configuration of the casing of the motor vehicle silencer and the shield components are therefore shaped in accordance with the configuration of the casing of the silencer to which they are to be fitted.

What I claim is:

1. The combination of a motor vehicle silencer which includes an elongated casing having an inlet pipe and an outlet pipe and a shield for said silencer, said shield including a protector plate for fitment underneath the casing to protect the underside thereof, the casing being mounted, in use, on a vehicle with its axis of elongation substantially horizontal, and a plurality of strap means for connecting said protector plate to the casing.

2. A shield for fitment to a motor vehicle silencer which includes an elongated casing having an inlet pipe and an outlet pipe, the casing being mounted, in use, on a vehicle with its axis of elongation substantially horizontal and extending in the direction of travel of the vehicle, the shield comprising a front plate which is formed in two parts which are arranged to be bolted together around the inlet pipe of the silencer to protect the front of the casing and a protector plate which is shaped for fitment underneath the casing to protect the underside thereof and a plurality of strap means for connecting the protector plate to the casing.

3. A shield for fitment to a motor vehicle silencer which includes an elongated casing having an inlet pipe and an outlet pipe, the casing being mounted, in use, on a vehicle with its axis of elongation substantially horizontal and extending in the direction of travel of the vehicle, the shield comprising a protector plate for fitment underneath the casing to protect the underside thereof, a front plate for fitment on top of the front of the casing, a back plate for fitment on top of the back of the casing and a plurality of strap means for connecting said protector plate and front and back plates to the casing.

4. The combination according to claim 1 wherein the protector plate is formed to provide a pair of longitudinally spaced outwardly facing channels which receive the strap means.

5. The combination according to claim 1 together with a back plate for fitment on top of the back of the casing.

6. A shield according to claim 2 wherein the protector plate is formed to provide a pair of longitudinally spaced outwardly facing channels which receive the strap means.

7. A shield according to claim 2 which includes a back plate for fitment on top of the back of the casing.

8. A shield according to claim 2 which includes a U-bolt fastener arrangement for bolting the two parts of the front plate together around the inlet pipe of the silencer.

9. A shield according to claim 3 wherein the protector plate is formed to provide a pair of longitudinally spaced outwardly facing channels which receive the strap means.